US006838196B2

(12) United States Patent
Aram

(10) Patent No.: US 6,838,196 B2
(45) Date of Patent: Jan. 4, 2005

(54) NICKEL-ALUMINIDE BASED WEAR RESISTANT MATERIAL FOR PISTON RINGS

(75) Inventor: Mehdi Aram, Partille (SE)

(73) Assignee: Koncentra Holding AB, Mölnlycke (SE)

(*) Notice: Subject to any disclaimer, the term of this patent is extended or adjusted under 35 U.S.C. 154(b) by 0 days.

(21) Appl. No.: 10/469,686

(22) PCT Filed: Mar. 18, 2002

(86) PCT No.: PCT/SE02/00503

§ 371 (c)(1),
(2), (4) Date: Sep. 3, 2003

(87) PCT Pub. No.: WO02/088407

PCT Pub. Date: Nov. 7, 2002

(65) Prior Publication Data

US 2004/0076851 A1 Apr. 22, 2004

(30) Foreign Application Priority Data

Mar. 27, 2001 (SE) .............................................. 0101089

(51) Int. Cl.⁷ ............................. B32B 15/04; F02F 3/00
(52) U.S. Cl. ....................... 428/698; 428/701; 428/702; 277/434; 277/440; 277/442; 277/456
(58) Field of Search ................................ 428/698, 323, 428/325, 701, 702; 277/434, 440, 442, 448, 456, 936

(56) References Cited

U.S. PATENT DOCUMENTS

| 5,236,787 A | * | 8/1993 | Grassi ........................ 428/552 |
| 5,281,484 A | | 1/1994 | Tank et al. |
| 5,743,012 A | | 4/1998 | Adams et al. |
| 6,025,065 A | | 2/2000 | Claussen et al. |

FOREIGN PATENT DOCUMENTS

| EP | 0 645 463 | 3/1995 |
| EP | 0 668 375 | 8/1995 |
| WO | WO 95/32314 | 11/1995 |

* cited by examiner

Primary Examiner—Jennifer McNeil
(74) Attorney, Agent, or Firm—Burns, Doane, Swecker & Mathis, LLP

(57) ABSTRACT

A piston ring comprises a coating of a wear-resistant composite composition, particularly intended for high temperature applications. The wear-resistant composite composition comprises a ceramic compound and at least 50 volume %, based on the total volume of the wear-resistant composition, of an intermetallic nickel-aluminide chosen from the group consisting of NiAl and $Ni_3Al$. A piston ring comprises a wear-resistant composite composition, particularly intended for high temperature applications. The wear-resistant composite composition comprises a ceramic compound and at least an intermetallic nickel-aluminide chosen from the group consisting of NiAl and $Ni_3Al$.

31 Claims, 4 Drawing Sheets

NICKEL-ALUMINIDE BASED WEAR RESISTANT MATERIAL FOR PISTON RINGS

FIELD OF THE INVENTION

The invention relates to a piston ring comprising a coating of a wear-resistant composite composition, particularly intended for high temperature applications, the wear-resistant composite composition comprising a ceramic compound.

The invention further relates to a piston ring comprising a wear-resistant composite composition, particularly intended for high temperature applications, the wear-resistant composite composition comprising a ceramic compound.

TECHNICAL BACKGROUND

Very specific demands have to be met by high temperature applications e.g. piston rings that are intended for use in for instance marine diesel engines, particularly as concerns strength, anti-corrosive properties, wear resistance, and material resilience. When used in a diesel engine the piston ring is arranged to abut on the one hand against an associated piston groove, on the other against an engine cylinder-bore.

Consequently, the ring should be wear-resistant, particularly at the interface towards the cylinder bore, where high friction is generated when the engine is in operation. The piston ring should therefore also possess an inherent tension or resilience whereby the piston ring will constantly be forced outwards, into abutment against the cylinder bore. In addition, upon each explosive stroke of the engine, the piston ring is urged with considerable force radially outwards, into abutment against the cylinder bore, with consequential increase of stress. Due to a high working temperature in engines and especially due to the impact of produced heat, from contact between piston rings and cylinder liner during the process, many materials loose some of their yield strength and show softening.

In operation, especially some contact areas between the piston ring and cylinder liner material are exposed to high temperatures, to considerable temperature differences, and to the effects of a highly corrosive environment.

In order to withstand the effects of these stress-inducing causes, the piston ring therefore also must exhibit considerable wear resistance, ductility, and thermal stability. By ductility is to be understood herein the maximum possible deformation of the material before cracking begins.

Today, piston rings are generally manufactured from a cast-iron blank, which meets the requirements imposed on the material as regards strength and resilience but not on wear resistance on the surface thereof that faces the cylinder bore. Cast iron does not possess the required thermal stability at high temperature. A cast-iron piston ring blank therefore usually is provided with a wear-resistant wear layer on the surfaces most exposed to wear.

The wear layer, which usually is formed by a chromium-compound material, is generally applied to the piston ring blank in an electrolysis process as described e.g. in EP 0 668 375. In accordance with the teachings of this specification the piston ring blank is given a hard chromium layer in an electrolysis process. However, difficulties do arise in achieving a sufficiently strong bond between the material of the blank and the material of the wear layer, which causes problems, because of the risk that the material of the wear layer be torn away from the material of the blank. When this happens, the comparatively soft material of the blank-material surface is exposed to wear in the area of contact against the cylinder bore, with resulting considerable shortening of the life of the piston ring.

Another problem is that the coating gradually wears away, even if the bond between the surfaces is comparatively strong. The wear on the piston ring progresses slowly as long as the wear layer is intact but very rapidly, once that layer has disappeared. As a result, it may be difficult to determine in time when a piston ring change should be made.

Another issue is to increase the oxidation resistance of the piston ring at high temperatures. In WO9532314 there is provided a nickel-aluminum intermetallic basis alloy considered suitable for pieces, such as gas turbine blades, exposed to a high and continuous thermal stress. This alloy is claimed to improve therml, oxidation and thermo-shock resistance. However, the hardness properties and wear-resistance of this compound are considered insufficient for use by other pieces and elements exposed to wear and thermal stress.

SUMMARY OF THE INVENTION

The object of the present invention is to provide a material, particularly intended for medium to high temperature applications such as piston rings, that meets the requirements necessary as regards wear resistance, resilience, anti-corrosiveness, hardness, thermal stability and ductility.

Another object is to provide a piston ring, which does not suffer from the above drawbacks found in the prior art. Other features and advantages of the present invention will become apparent from the following description of the invention.

The present invention provides a wear-resistant composition, intended for medium to high temperature applications, particularly for piston rings, wherein the material comprises a composite ceramic compound (hard phase). Said composite composition also comprises at least an intermetallic nickel-aluminide chosen from the group consisting of NiAl and Ni3Al or a mixture thereof.

One of the advantages of the inventive wear-resistant composition is the ability to withstand yield strength softening up to a temperature of around 600° C. It is not unusual that a piston ring locally has to withstand temperatures in the range of 400 to 500° C. or more in working conditions. If the metallic material (the matrix) in such a composite for some reason, e.g. softening caused by high temperature, can not withstand movement of the hard phase in the composite, the hard phase is not likely to stay in place. The hard phase will leave their place and then work like a polishing agent and cause higher wear (three body wearing).

It is thus beneficial to use an intermetallic nickel-aluminide for providing support to the ceramic compound in the composite material. An important object for the intermetallic nickel-aluminide is to keep the hard phase in place during contact with liner material in order to avoid the earlier described polishing effect even in the above-mentioned temperature range.

In a preferred embodiment of the present invention said composite composition comprises a matrix formed by the intermetallic nickel-aluminides from said group.

It is thus advantageous to use an intermetallic nickel-aluminide matrix for providing support to the ceramic compound in the composite material. An important object for the intermetallic nickel-aluminide matrix is to keep the hard phase in place.

The wear-resistant composition according to the invention also comprises a hard phase consisting preferably of at least a ceramic compound chosen from a group consisting of aluminium oxide, chromium carbide, chromium oxide and silicon carbide e.g. $Al_2O_3$, $Cr_3C_2$, $Cr_2O_3$, and SiC.

The hard phase improves the wear resistance and the ability to resist thermal fatigue deformation of the composite. At the same time the coefficient of thermal expansion of the inventive composition is reduced. The compatibility of hard phase and matrix is an important factor in this case. $Al_2O_3$ is preferred due to higher interface bonding with the matrix material but the other hard phases are also working well in this respect.

It is also an object of the present invention to provide a piston ring, particularly intended for diesel engines, consisting of the inventive wear-resistant composition.

It is also provided in accordance with the present invention a piston ring, particularly intended for diesel engines, wherein said piston ring comprises a coating of the inventive wear resistant composition. By using the wear-resistant composition especially as coating on a substrate a more cost efficient product is obtained.

While the invention has been described in detail and with reference to specific embodiments thereof, it will be apparent for one skilled in the art that various changes and modifications can be made therein without departing from the spirit and scope thereof. Thus it is understood that various methods such as plasma-, HVOF spraying or other related prior art methods can be used to apply the inventive composition to a substrate such as e.g. a piston, a piston ring and a cylinder liner or at least parts of them.

BRIEF DESCRIPTION OF THE DRAWING

Currently preferred embodiments of the present invention will now be described in more detail, with reference to the accompanying drawing.

FIG. 1 is a schematic representation of superlattice dislocations in a two-dimensional simple cubic lattice.

DETAILED DESCRIPTION OF PREFERRED EMBODIMENTS

Figure 2:
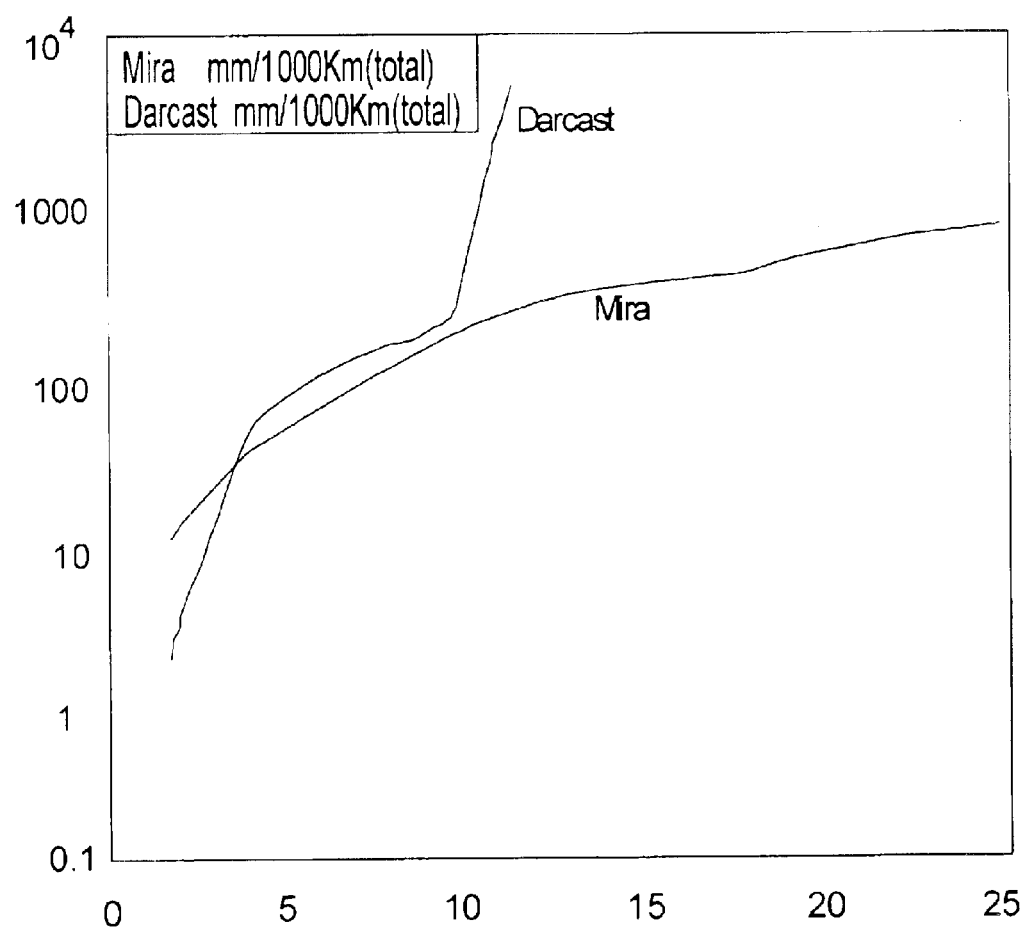
FIG. 2 is a table showing the rate of wear relative to pressure-exposure in tests of a composition in accordance with one embodiment of the invention vis-a-vis a well-known cast iron for piston rings named Darcast.

In accordance with a preferred embodiment of the invention it is provided a wear-resistant composite composition, intended for medium to high temperature applications and particularly for piston rings, wherein the wear-resistant composite composition comprises a ceramic mixture of intermetallic composition and a ceramic compound. The wear-resistant composite composition specifically comprises at least one intermetallic nickel-aluminide chosen from the group consisting of NiAl and $Ni_3Al$. The intermetallic nickel-aluminide or nickel-aluminides forms a matrix to which a hard phase is added.

As used herein the term intermetallic compounds are a class of materials, which can be viewed as occupying an intermediate position regarding the properties of the material between metallic alloys and ceramics. They are also considered as a unique class of metallic materials that form long-range ordered crystal structures below a critical temperature, generally referred to as the critical ordering temperature $(T_c)$.

The essential condition for a substitutional solid solution of a suitable composition to become ordered is that unlike atoms i.e. different elements must attract each other more than like atoms in order to lower the free energy upon ordering. In other words, the degree of order of intermetallic compounds is closely related to the nature of the bonding. These ordered intermetallics usually exist in relatively narrow compositional ranges around simple stoichiometric ratio.

The ordered crystal structure of nickel aluminides makes it feasible to achieve high tensile ductility. The ductility of polycrystalline $Ni_3Al$ is further increased by micro alloying with boron addition that segregates the grain boundaries and suppresses brittle intergranular fraction.

An above-mentioned effect depending on the crystal structure is represented schematically in FIG. 1 by a super lattice dislocation in a two-dimensional simple cubic lattice. Intermetallic compounds exhibit a very high yield stress that is often maintained to elevated temperatures. Deformation in ordered alloys is controlled by the glide of super lattice or paired dislocations, as super dislocations, further illustrated in FIG. 1 for a two-dimensional ordered lattice having an AB composition.

The first, or leading, dislocation creates a layer of anti-phase domain, which can be thought of simply as a layer of wrong bonding, and the second, or following, dislocation restores the order. The relatively low mobility of super dislocations gives higher yield strength; that is, yield strength increases rather than decreases with increasing temperature.

The wear-resistant composition comprises a matrix formed by an intermetallic nickel-aluminide chosen from a group consisting of NiAl and Ni3Al. The composition also comprises a ceramic compound chosen from a group consisting of chromium carbide, chromium oxide and aluminium oxide e.g. $Cr_2O_3$, $Cr_3C_2$, SiC and $Al_2O_3$.

Examples of embodiments of the present invention are given below.

EXAMPLE 1

A composition was prepared by forming a mixture of the following ingredients in the parts by weight quoted in Table 1:

TABLE 1

| No. | Name | Element | Ni | Al | Cr | Zr | Nb |
|---|---|---|---|---|---|---|---|
| 1 | NiAl—Nb | wt % | 65–66 | 27–28 | 2–3 | 0.5–1 | 4–4.5 |

A powder was prepared by forming the mixture of components as set out in table 1 of example 1. Furthermore, 5–10% by volume of the initial mixture was replaced by 5–10% by volume of $Al_2O_3$. The resulting composition was heated and applied to a substrate in accordance with prior art techniques to form a wear-resistant composition on the substrate. The resulting composite had good wear resistance, ductility, and thermal stability properties.

FIG. 2 is a figure showing the rate of wear relative to pressure-exposure in tests of a composition in accordance with one embodiment of the invention vis-a-vis a well-known cast iron for piston rings known as Darcast.

Figure 3:
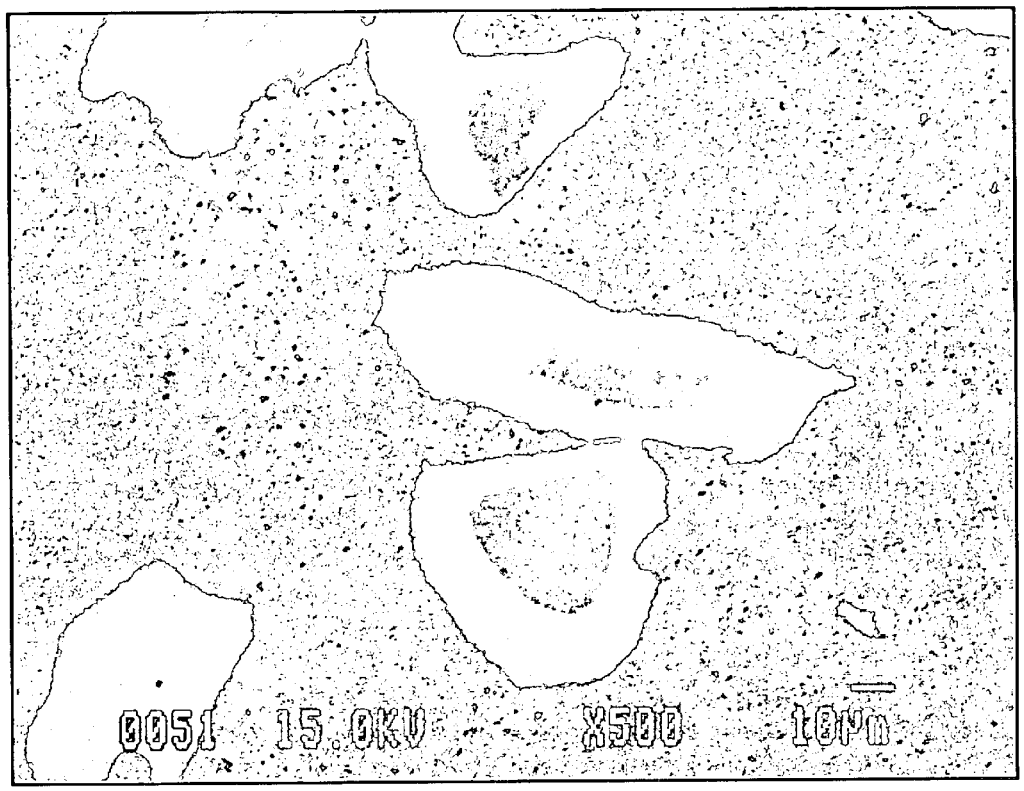
FIG. 3 is a SEM-picture of a composition in accordance with the invention.

In order to further illustrate the properties of the invention, reference is made to FIG. 3, which is an SEM-picture of a preferred embodiment of a wear-resistant composition in accordance with the invention. The picture discloses a matrix comprising darker "islands" of a hardphase. In this case the hardphase is a chromium carbide. By means of diffusion between matrix and hardphase a mixed zone, which is also clearly visible on the picture, is formed. The mixed zone provides for that a hard bonding is formed between hardphase and matrix and preferably the mixed zone is formed symmetrically around the hardphase.

A further embodiment of the wear-resistant composition according to the invention is outlined in the following example 2.

EXAMPLE 2

TABLE 2

| No. | Name | Element | Ni | Al | Fe | Mn | Ti | Zr | B |
|---|---|---|---|---|---|---|---|---|---|
| 2 | Ni3Al—Fe | wt % | 77–78 | 9–10 | 11–12 | 0.5 | 0.5 | 0.01 | 0.1 |

A powder was prepared by forming an initial mixture of components as set out in table 2 of example 2. Furthermore, 5–10% by volume of the initial mixture was replaced by 5–10% by volume of $Al_2O_3$. The resulting composition was exposed to heat treatment and applied to a substrate in accordance with e.g. prior art techniques to form a wear-resistant composition on a substrate. The resulting composite had good wear resistance, ductility, and thermal stability.

EXAMPLE 3

A third example of a wear-resistant composition according to the invention is given in the below table.

TABLE 3

| No. | Name | Element | Ni | Al | Cr | C | Mn | Ti | Zr | B |
|---|---|---|---|---|---|---|---|---|---|---|
| 3 | Ni3Al—Cr | wt % | 81–83 | 8–9 | 7–8 | 0.1 | 0.4–0.5 | 1 | 0.6 | 0.1 |

A wear resistant composition was prepared by forming the mixture of components as set out in Table 3 of example 3. In this example chromium carbide is used as hard phase compared to the previous given examples. By, in accordance with the previous examples adding the hard phase $Al_2O_3$ to the mixture in table 3 instead, an increased thermal stability is obtained compared to the mixture according to table 3. Though $Al_2O_3$ is given as the preferred alternative for a hard phase compound in the above stated examples, excellent results were achieved with other hard phase compounds as well.

It is of course possible to use any hard phase from the group consisting of chromium carbide, chromium oxide, silicon carbide and aluminium oxide e.g. $Cr_2O_3$, $Cr_3C_2$, SiC and $Al_2O_3$ in combination with any composition given in the tables 1–3.

Figure 4:
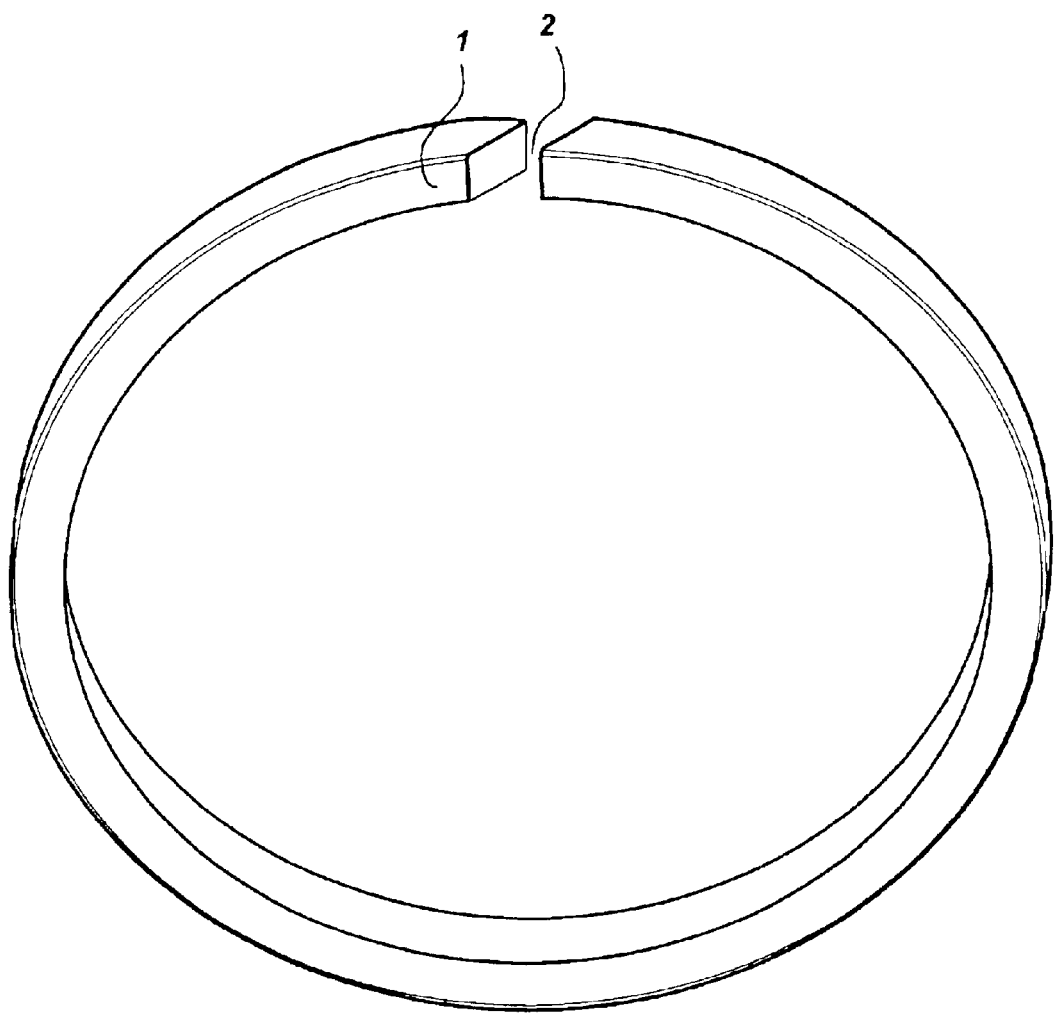
FIG. 4 is one embodiment of a piston ring in accordance with the present invention.

FIG. 4 is one embodiment of a piston ring in accordance with the invention. The piston ring preferably comprises a coating of said wear-resistant composition. In a second preferred embodiment of the invention the piston ring consists of the inventive wear resistant composition.

As will be appreciated, the present invention is not limited to the embodiments and examples described herein. For example, further substances may be added to the wear-resistant composition in order to modify its properties in some respect. Also other mixtures and combinations than those listed in the tables 1–3 are possible within the scope of the invention. For special conditions up to 50%, preferably between 1–30%, and most preferably between 5–10% by volume of the total composition can be hard phase such as, chromium oxide, silicon carbide, $Cr_3C_2$ and $Al_2O_3$.

What is claimed is:

1. A piston ring comprising a coating of a wear-resistant composite composition, particularly intended for high temperature applications, the wear-resistant composite comprising a ceramic compound, wherein said wear-resistant composition also comprises at least 50 volume %, based on the total volume of the wear-resistant composition, of an intermetallic nickel-aluminide chosen from the group consisting of NiAl and $Ni_3Al$.

2. A piston ring according to claim 1, wherein said composition comprises a matrix formed by an intermetallic nickel-aluminide chosen from said group consisting of NiAl and $Ni_3Al$.

3. A piston ring according to claim 2, wherein the intermetallic nickel-aluminide is a mixture of NiAl and $Ni_3Al$.

4. A piston ring according to claim 1, wherein the intermetallic nickel-aluminide is a mixture of NiAl and $Ni_3Al$.

5. A piston ring according to claim 1, wherein the ceramic compound is $Cr_3C_2$.

6. A piston ring according to claim 1, wherein the ceramic compound is a chromium oxide.

7. A piston ring according to claim 1, wherein the ceramic compound is SiC.

8. A piston ring according to claim 1, wherein the ceramic compound is aluminum oxide.

9. A piston ring according to claim 1, wherein the composition comprises between 70–99 volume % intermetallic nickel-aluminide based on the total volume of the wear-resistant composition.

10. A piston ring according to claim 1, wherein the composition comprises between 90–95 volume % intermetallic nickel-aluminide based on the total volume of the wear-resistant composition.

11. A piston ring according to claim 1, wherein said chromium oxide is $Cr_2O_3$.

12. A piston ring according to claim 1, wherein said aluminum oxide is $Al_2O_3$.

13. The piston ring according to claim 1, wherein the wear-resistant composite composition consists essentially of the ceramic compound and the intermetallic nickel-aluminide.

14. A piston ring comprising a wear-resistant composite composition, particularly intended for high temperature applications, the wear-resistant composite composition comprising a ceramic compound, wherein said wear-resistant composition also comprises at least an intermetallic nickel-aluminide chosen from the group consisting of NiAl and $Ni_3Al$.

15. A piston ring according to claim 14, wherein said composition comprises a matrix formed by an intermetallic nickel-aluminide chosen from said group consisting of NiAl and $Ni_3Al$.

16. A piston ring according to claim 14, wherein the intermetallic nickel-aluminide is a mixture of NiAl and $Ni_3Al$.

17. A piston ring according to claim 14, wherein the ceramic compound is $Cr_3C_2$.

18. A piston ring according to claim 14, wherein the ceramic compound is a chromium oxide.

19. A piston ring according to claim 14, wherein the ceramic compound is SiC.

20. A piston ring according to claim 14, wherein the ceramic compound is aluminum oxide.

21. A piston ring according to claim 14, wherein the composition comprises at least 50 volume % intermetallic nickel-aluminide based on the total volume of the wear-resistant composition.

22. A piston ring according to claim 14, wherein the composition comprises between 70–99 volume % intermetallic nickel-aluminide based on the total volume of the wear-resistant composition.

23. A piston ring according to claim 14, wherein the composition comprises between 90–95 volume % intermetallic nickel-aluminide based on the total volume of the wear-resistant composition.

24. A piston ring according to claim 14, wherein said chromium oxide is $Cr_2O_3$.

25. A piston ring according to claim 14, wherein said aluminum oxide is $Al_2O_3$.

26. The piston ring according to claim 14, wherein the wear-resistant composite composition consists essentially of the ceramic compound and the intermetallic nickel-aluminide.

27. A piston ring formed by the process of:
    preparing a mixture comprising a ceramic compound and at least one intermetallic nickel-aluminide; and
    applying the mixture onto a substrate to produce a wear-resistant coating which forms an outer surface of the piston ring.

28. The piston ring according to claim 27, wherein the mixture comprises $Ni_3Al$ and $Al_2O_3$.

29. The piston ring according to claim 27, wherein the coating comprises a matrix formed by the intermetallic nickel-aluminide which includes $Ni_3Al$.

30. The piston ring according to claim 27, wherein the coating comprises a matrix formed by the intermetallic nickel-aluminide, a hard phase and a mixed zone around the hard phase.

31. The piston ring according to claim 27, wherein the mixture consists essentially of the ceramic compound and the intermetallic nickel-aluminide.

* * * * *